(12) United States Patent
Krause et al.

(10) Patent No.: US 8,718,844 B2
(45) Date of Patent: May 6, 2014

(54) CHARGE NOTIFICATION METHOD FOR EXTENDED RANGE ELECTRIC VEHICLES

(75) Inventors: Kevin R. Krause, Plymouth, MI (US); Thomas A. Gault, Troy, MI (US); Paul H. Pebbles, Novi, MI (US); Dana B. Fecher, Farmington Hills, MI (US); Steven J. Ross, Livonia, MI (US); Armando A. Duer, West Bloomfield, MI (US)

(73) Assignee: General Motors LLC, Detroit, MI (US)

( * ) Notice: Subject to any disclaimer, the term of this patent is extended or adjusted under 35 U.S.C. 154(b) by 519 days.

(21) Appl. No.: 12/839,013

(22) Filed: Jul. 19, 2010

(65) Prior Publication Data

US 2012/0016551 A1 Jan. 19, 2012

(51) Int. Cl.
*G06F 7/00* (2006.01)
*G01S 19/42* (2010.01)

(52) U.S. Cl.
USPC ........... 701/22; 909/903; 320/137; 180/65.29

(58) Field of Classification Search
USPC .................... 701/29; 903/903, 907; 320/137; 180/65.29
See application file for complete search history.

(56) References Cited

U.S. PATENT DOCUMENTS

| | | | | |
|---|---|---|---|---|
| 5,488,283 A * | 1/1996 | Dougherty et al. | .......... | 307/10.1 |
| 5,689,174 A * | 11/1997 | Pacheco, Sr. | .......... | 322/16 |
| 6,018,694 A * | 1/2000 | Egami et al. | .......... | 701/102 |
| 7,525,206 B2 * | 4/2009 | Kagoshima et al. | .......... | 290/40 C |
| 7,925,906 B2 * | 4/2011 | Ranganathan et al. | .......... | 713/320 |
| 8,565,930 B2 * | 10/2013 | Miwa | .......... | 700/292 |
| 8,565,953 B2 * | 10/2013 | Kato et al. | .......... | 701/22 |
| 8,571,736 B2 * | 10/2013 | Falkenstein et al. | .......... | 701/22 |
| 8,611,824 B2 * | 12/2013 | Ichikawa | .......... | 455/66.1 |
| 2009/0085759 A1 * | 4/2009 | Lindsey et al. | .......... | 340/660 |
| 2009/0167254 A1 * | 7/2009 | Eberhard et al. | .......... | 320/152 |
| 2009/0210357 A1 * | 8/2009 | Pudar et al. | .......... | 705/412 |
| 2009/0216688 A1 * | 8/2009 | Kelty et al. | .......... | 705/418 |
| 2010/0106401 A1 * | 4/2010 | Naito et al. | .......... | 701/201 |
| 2010/0244782 A1 * | 9/2010 | Nagayama et al. | .......... | 320/162 |
| 2011/0032110 A1 * | 2/2011 | Taguchi | .......... | 340/636.1 |
| 2011/0166725 A1 * | 7/2011 | Booth et al. | .......... | 701/22 |
| 2011/0288765 A1 * | 11/2011 | Conway | .......... | 701/201 |

* cited by examiner

*Primary Examiner* — Tuan C. To
(74) *Attorney, Agent, or Firm* — Leydig, Voit & Mayer, Ltd.

(57) ABSTRACT

The described principles provide a method and system for assisting a user of an electric vehicle in maintaining a charge state of the chargeable onboard energy storage system so as to be able to forgo the use of an auxiliary power unit to great extent. The method, also implemented by the system, comprises identifying charging locations for the vehicle, and prompting the user to charge the vehicle when the vehicle is at a charging location and a charge is need to avoid the use of the auxiliary power unit for a learned or planned journey. The charge reminder my be visible and/or audible within the vehicle and may optionally be remote from the vehicle.

20 Claims, 5 Drawing Sheets

CHARGE NOTIFICATION METHOD FOR EXTENDED RANGE ELECTRIC VEHICLES

BACKGROUND OF THE INVENTION

With the advent of extended range electric vehicles, users are given the mechanical simplicity and energy efficiency of electric-only drive without losing the range and energy security of fuel-based systems. As used herein, the term "extended range electric vehicle" refers to a vehicle that is propelled by one or more electric motors linked to the vehicle drive wheel or wheels, wherein the electric energy used to power the motors is stored in an onboard battery system, and wherein an onboard auxiliary power unit, e.g., a gasoline or diesel engine, powers an onboard generator to supply additional electrical energy to the onboard battery system.

In this way, a smaller onboard battery system may be used without risking stranding the vehicle owner once the battery energy is depleted. Moreover, since the onboard auxiliary power unit only drives a generator and need not be linked to the drive wheels directly, the use of gearing, clutches and other mechanical power transmission systems can be minimized. Typically, the primary charging source for an extended range electric vehicle is a stationary power source such as a plug-in receptacle, used while the vehicle is not in use, e.g., overnight or during the work day.

However, a user may not necessarily remember to plug in their vehicle when they have finished using it for a time, nor does the vehicle always need to be plugged in. For example, if the vehicle has not been used or has been used very little the previous day, the vehicle may not need to be charged. Moreover, even when the vehicle battery system is in need of charging, a reminder to that effect is of no use if the user is not in a location where the vehicle can be parked and charged. Thus, such reminder systems can be a substantial annoyance to the user.

Moreover, although extended range electric vehicles provide range security by way of the auxiliary power unit, many users will still desire to engage in electric only driving, i.e., without using auxiliary power, to the extent possible. However, it is not always possible for a user to know whether a planned excursion will extend beyond the electric only range of the vehicle. For example, if a vehicle has an electric-only range of 40 miles, then a round trip excursion that is 21 miles one-way will require auxiliary power before the user is back at the starting point where they can plug the vehicle in to the stationary power source. Thus, a system of providing battery charge state clarity and predictability is needed.

BRIEF SUMMARY OF THE INVENTION

The invention provides a system and apparatus for assisting users of electric vehicles in maintaining a proper charge state in their vehicle batteries or other onboard storage system. In particular in one aspect, the described method assists a user of an electric vehicle having a chargeable onboard energy storage system in maintaining a charge state of the chargeable onboard energy storage system. The method includes, in this aspect, first identifying one or more charging locations for the vehicle, e.g., a home or office charging location, and then determining the charge state of the onboard energy storage system to evaluate the remaining usable energy in the onboard energy storage system.

If the remaining usable energy in the onboard energy storage system is at least as great as a point of reference value, then the system is deemed to be sufficient for upcoming energy needs, whereas if the remaining usable energy in the onboard energy storage system is found to be less than the point of reference value, and if and only if the vehicle is found to be powered down, then the system resolves the current location of the vehicle. If the current vehicle location matches one of the identified charging locations for the vehicle, the system conveys a charge reminder to the user of the vehicle.

In a further aspect of the described principles, if a vehicle is left stationary for an extended amount of time and the battery charge is lost due to the passage of time, the system can notify the user via phone call, text message, or email that charging is required. Alternatively, because it is sometimes difficult to precisely ascertain the state of charge of the system, a reminder may be provided in the event that the vehicle is located at a charging station but a certain time arrives without the vehicle having been plugged in. In an aspect of the described principles, the reminder is sent only if the vehicle is at a charging location. In a further aspect, the permissible hours of such remote notification can be configured by the user.

Other objects and advantages of the invention will be appreciated by those of skill in the art upon reading this description in conjunction with the included figures of which:

DETAILED DESCRIPTION OF THE INVENTION

Before discussing the details of the invention and the environment wherein the invention may be used, a brief overview is given to guide the reader. In general terms, not intended to limit the claims, the invention is directed to a system for ensuring a proper charge level in an electric vehicle, e.g., an extended range electric vehicle or other vehicle which generally uses stored electric power only during travel, but which has an alternative energy system so as to not rely invariably upon the presence of sufficient stored electrical energy. In this context, a system and apparatus are described for assisting vehicle users in maintaining a proper charge state in their vehicle batteries, allowing them to use the vehicle in the most energy efficient manner possible.

Figure 1:
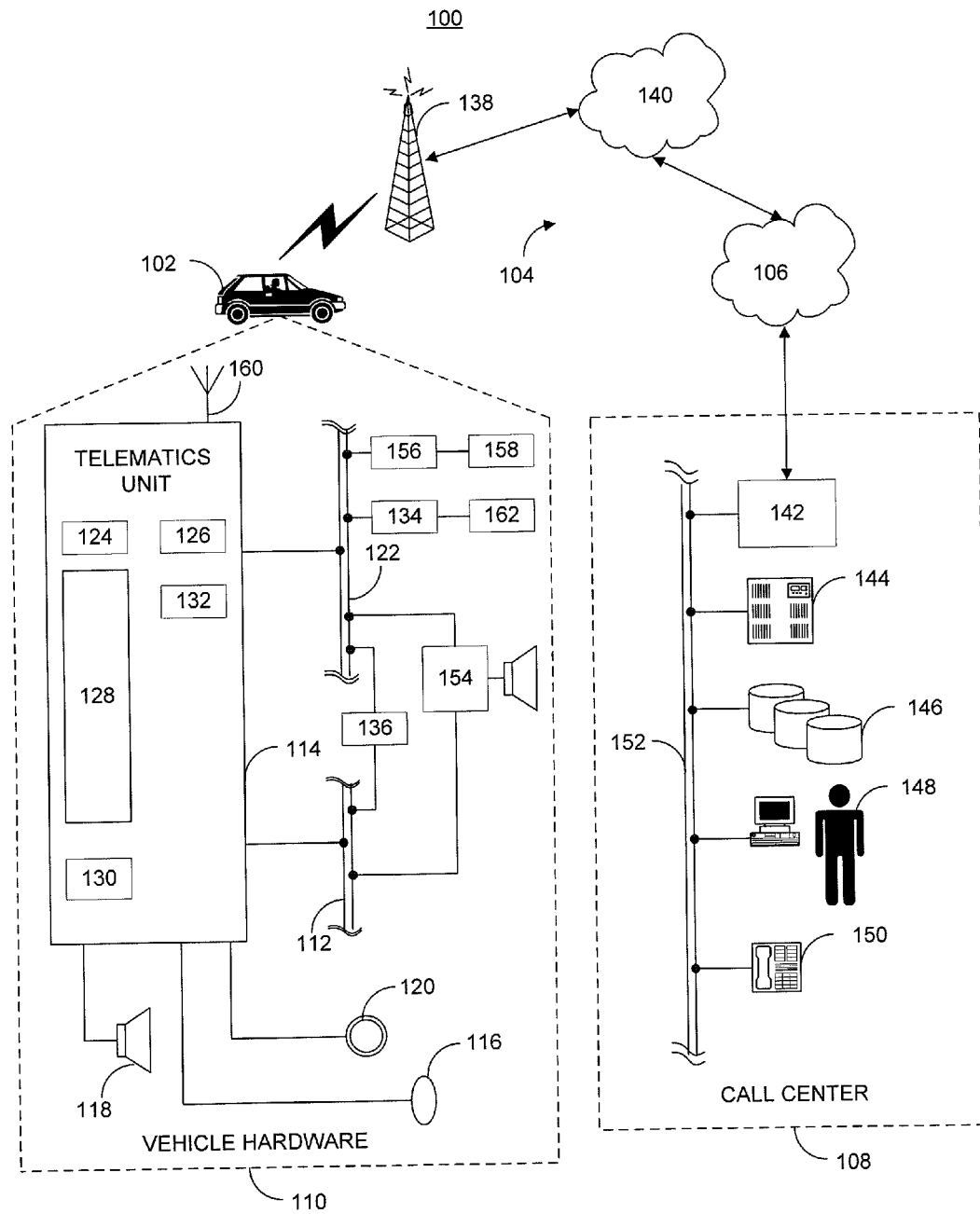
FIG. 1 is a schematic diagram of an operating environment for a mobile vehicle communication system within which the described principles may be implemented.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As discussed in summary above, the telematics unit 114 may be used in conjunction with other components described by reference to FIG. 1 to enable location-based battery system charge state monitoring and related notifications to the user. Before describing this aspect in greater detail, an exemplary electric vehicle is described with reference to FIG. 2 to provide the context within which aspects of the invention may be implemented.

Figure 2:
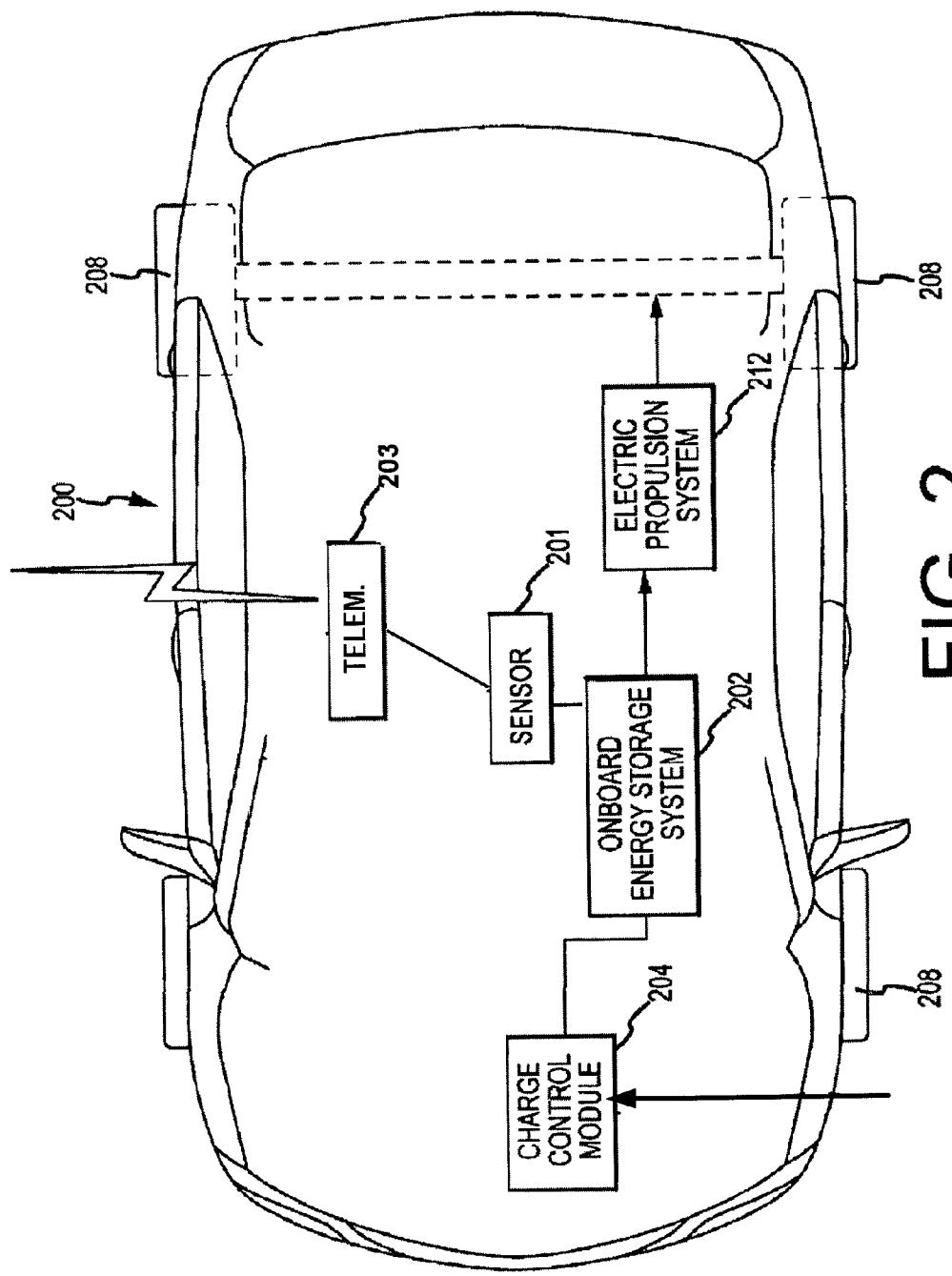
FIG. 2 is a schematic diagram of an electric vehicle within which the described principles may be implemented.

With reference to FIG. 2 there is shown an example of an electric vehicle architecture 200 that may be used with the present system and method. Although the illustrated architecture does not show an engine or APU, it will be appreciated that the electrical storage facility is at least externally chargeable via a plug or other external interface, and may additionally be internally chargeable via an APU, regenerative braking, etc. The illustrated plug-in vehicle 200 includes a number of basic systems to allow the controlled and efficient use of electrical power to propel the vehicle 200.

In particular, the illustrated system includes an onboard energy storage system 202, which may be a battery, or other chemical, electrochemical, or mechanical energy storage system. Onboard energy storage system 202 may be realized as a rechargeable battery pack having a single battery module or any number of individual battery modules or cells. A sensor 201 linked to the energy storage system 202 is used to analyze the state of charge/discharge of the energy storage system 202. The sensor 201 may be linked to a telematics unit 203, such as described in regard to element 114 of FIG. 1. A charge control module 204 coupled to the onboard energy storage system 202 allows for the controlled charging of the energy storage system 202, to avoid damage to the system and to ensure full charging.

The energy storage system 202 supplies energy, e.g., electrical energy, to a vehicle propulsion system, e.g., electric propulsion system 212. The electric propulsion system 212 may include one or more electric motors, e.g., brushed or brushless motors of an AC or DC configuration, to drive one or more wheels 208. Electronic devices, electronic control modules, and processing components of plug-in vehicle 200 may be coupled together using a data communication bus, conductive elements, and/or any suitably configured interconnection architecture. FIG. 2 depicts various electrical and mechanical connections and couplings in a very simplified manner for ease of description, and should not be understood to limit the number or type of interconnections or components. Moreover, it is not intended to show every connection or component needed for operation of the vehicle 200.

The charge control module 204 may include any type of processing element or vehicle controller, and it can be equipped with nonvolatile memory, random access memory (RAM), discrete and analog input/output (I/O), a central processing unit, and/or communications interfaces for networking within an automotive communications network. Moreover, the method steps described here may be embodied directly in hardware, in firmware, in a software module executed by a processor, or in any practical combination thereof. A software module may reside in RAM memory, flash memory, ROM memory, EPROM memory, EEPROM memory, registers, a hard disk, a removable disk, a CD-ROM, or any other form of storage medium known in the art. In this regard, an exemplary storage medium can be coupled to a processor such that the processor can read information from, and write information to, the storage medium. In the alternative, the storage medium may be integral to the processor. As an example, the processor and the storage medium may reside in an ASIC.

Figure 3:
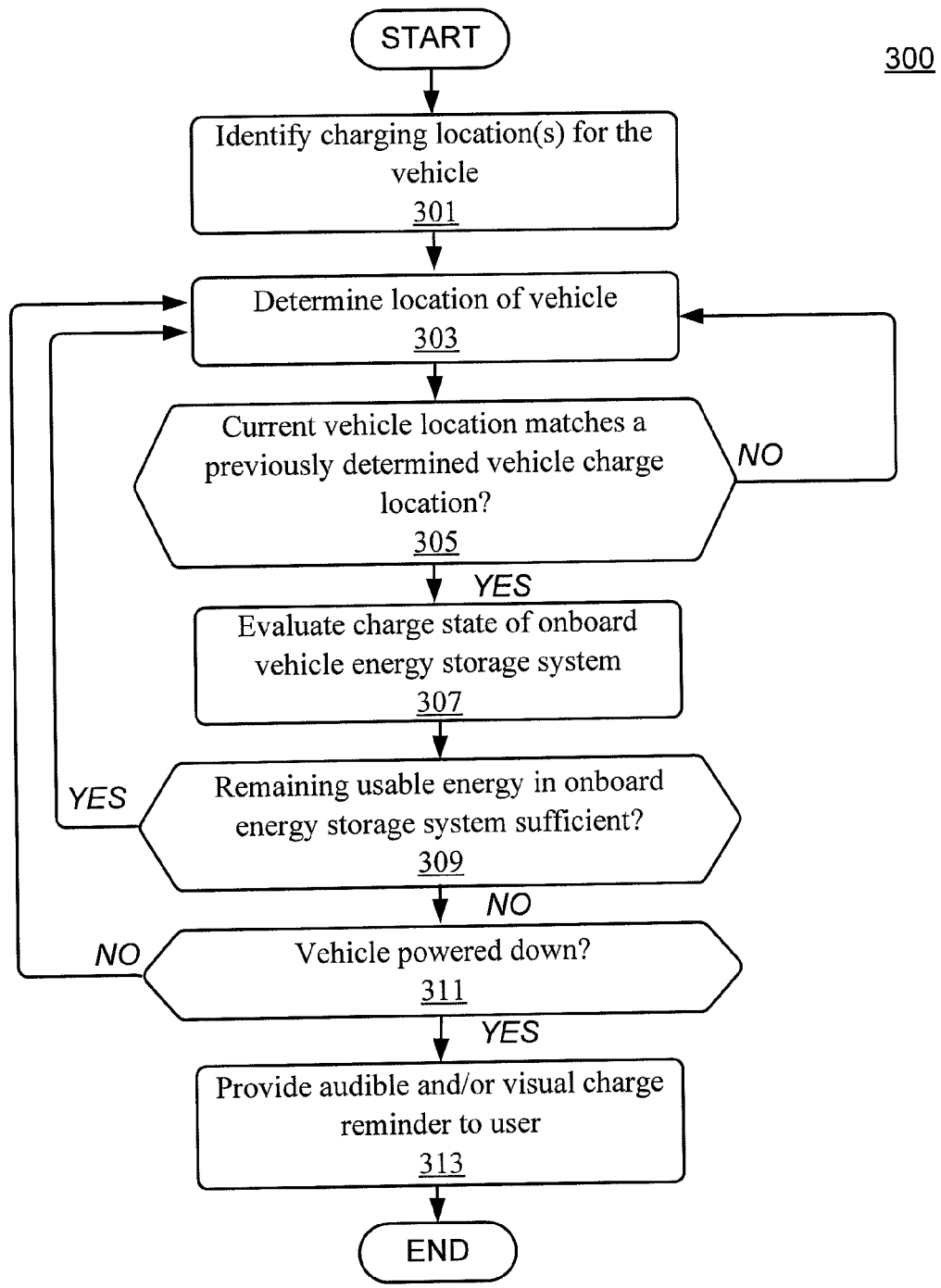
FIG. 3 is a flow chart illustrating a process for providing a notification to a user regarding charging of vehicle batteries.

As noted above, the described principles provide a system that creates user awareness regarding when to charge the batteries in their vehicle such as vehicle 200. The process is susceptible to various equivalent implementations, one of which is shown in the flow chart 300 of FIG. 3.

It will be appreciated that in a preferred implementation, the process 300 is executed at the vehicle 200 via the telematics unit 114 and/or associated components, with assistance as appropriate from remote entities such as the call center 108 in certain further implementations. As such, the execution of process 300 occurs via the computerized execution of computer-executable instructions stored on a computer-readable medium, e.g., RAM, ROM, PROM, volatile, nonvolatile, or other electronic memory mechanism.

The process 300 begins at stage 301 with the identification of one or more charging locations for the vehicle 200. This step may request user input of such data, or may automatically record such data based on sensing one or more locations where charging has occurred. For example, the user's home location, if used for charging, may be detected and identified as a charging location for the vehicle. In more general terms, the charging locations are those locations whereat the user may be expected to charge the vehicle when a charge is needed. Thus, a charging location for one vehicle is in many cases not going to be a charging location for another vehicle. This is especially true when the charging location is a user's home location (i.e., the user's house).

Having determined the one or more charging locations for the vehicle 200, the process moves to stage 303, wherein the process 300 makes a determination of the location of the vehicle 200 of interest. The determination of location may be accomplished in one or more of a number of ways, e.g., through GPS, local Wi-Fi network identifier, or a combination of the two in the case that GPS is obstructed.

At stage 305, the process 300 determines whether the current vehicle location matches one of the previously determined vehicle charge locations. If at stage 305 it is determined that the current vehicle location does not match one of the previously determined vehicle charge locations, then the process 300 reverts to stage 303.

Otherwise, the process 300 evaluates the charge state of the onboard energy storage system 202 at stage 307. For example, if the onboard energy storage system 202 is a battery or battery bank, the system may evaluate the charge state of the onboard energy storage system 202 by reading a static or dynamic voltage level at sensor 201. The sensor 201, telematics unit 114, or other onboard entity may also maintain a record of battery usage, so that a comparison of energy used against energy capacity can be made at any time to determine the remaining energy in the battery.

At decision stage 309, the process 300 determines whether the remaining usable energy in the onboard energy storage system 202 is sufficient. Sufficiency of the remaining energy may be measured by reference to a predetermined reserve requirement, by the ability of the remaining energy to complete a known user trip, e.g., a daily commute, or some other benchmark. If the remaining energy is found to be sufficient, then the process 300 returns to stage 303.

The frequency with which the process returns to stage 303 is not critical, and should balance the likely discharge rate of the onboard energy storage system 202 given the vehicle's current usage rate against the desire to avoid excessive cycling of the process 300. Thus, for example, if the vehicle 200 is in motion and drawing a significant amount of energy from the onboard energy storage system 202, the frequency of returning to stage 303 will preferably be much higher than if the vehicle is motionless or operating in a low energy usage state.

If at stage 309 the remaining energy is found to be insufficient, then the process 300 moves forward to stage 311. At stage 311, the process 300 engages in a determination as to whether the vehicle 200 is powered down, i.e., turned off or otherwise in a state so as to indicate that the vehicle will be stationary for a period of time. If it is determined at stage 311 that the vehicle 200 is not yet powered down, then the process loops back to stage 303.

Otherwise, the system conveys a charge reminder to the user at stage 313, e.g., via an audible and/or visual reminder, such as through the user interface elements of the telematics unit 114. The reminder may be in any suitable format, but examples include an audible or visual warning stating "charge required" or the like, a warning light, a beeping or other alarm, etc. The alarm may persist or may time out. In the event of timing out, the alarm may restart upon reentry of the vehicle by a user or other indicator of user presence. If the charge control module 204 senses that charging has begun, the process 300 may be reset.

In this way, the user is apprised of a need for charging only at a time and place where the user can remedy the need for charging. The inventors have found that this system would avoid any unnecessary distraction and frustration, while still ensuring that the vehicle is able to be used in the electric-only mode to the greatest extent possible.

Moreover, in one aspect, the process 300 continues to monitor charge state, and if the vehicle is sitting stationary for an extended period of time such that battery charge is gradually lost and reaches a point where a recharge is need, the system will notify the user via phone call, text message, or email that charging is required. In an alternative implementation the notification is provided whenever the vehicle is located at a charging station and a designated time arrives without the vehicle having been plugged in. For example, if the vehicle is at a charging station on a weekday evening and has not been plugged in by 9:00 PM, a reminder may be sent. This avoids accidental undercharge situations when there is difficulty precisely ascertaining the state of charge of the system. Alternatively, the reminder may be sent without delay when the vehicle is detected to be at a charging location.

The means for such communication may include the telematics unit 114. This notification preferably occurs only if the vehicle is at the home location (or other identified user charging location). In a further aspect, the hours of notification can be configured by the user, such that notifications are not given during sleeping hours, etc.

In one aspect, the level of charge sufficiency of the onboard energy storage system 202 is measured with reference to a prospective navigation route such as may be dictated by turn-by-turn navigation instructions or according to a known commuting pattern, e.g., through pattern recognition or user input such as in an online route interface. When the prospective route is known, its driving distance can be calculated and the sufficiency of the state of charge of the onboard energy storage system 202 may be measured by reference to this calculated distance. In the case of navigation instructions downloaded to the vehicle, the charge state may be verified by reference to the route at the time of download. In the case of a regular commuting route, a user sets up a typical commuting schedule and the energy requirements are determined according to this schedule (e.g., for Mon-Fri, 30 miles of mixed driving per day). If the telematics system determines that the upcoming drive, e.g., a commute, cannot be covered by the current charge level, a notification is also sent to the user so they can charge the vehicle as described above.

Figure 4:
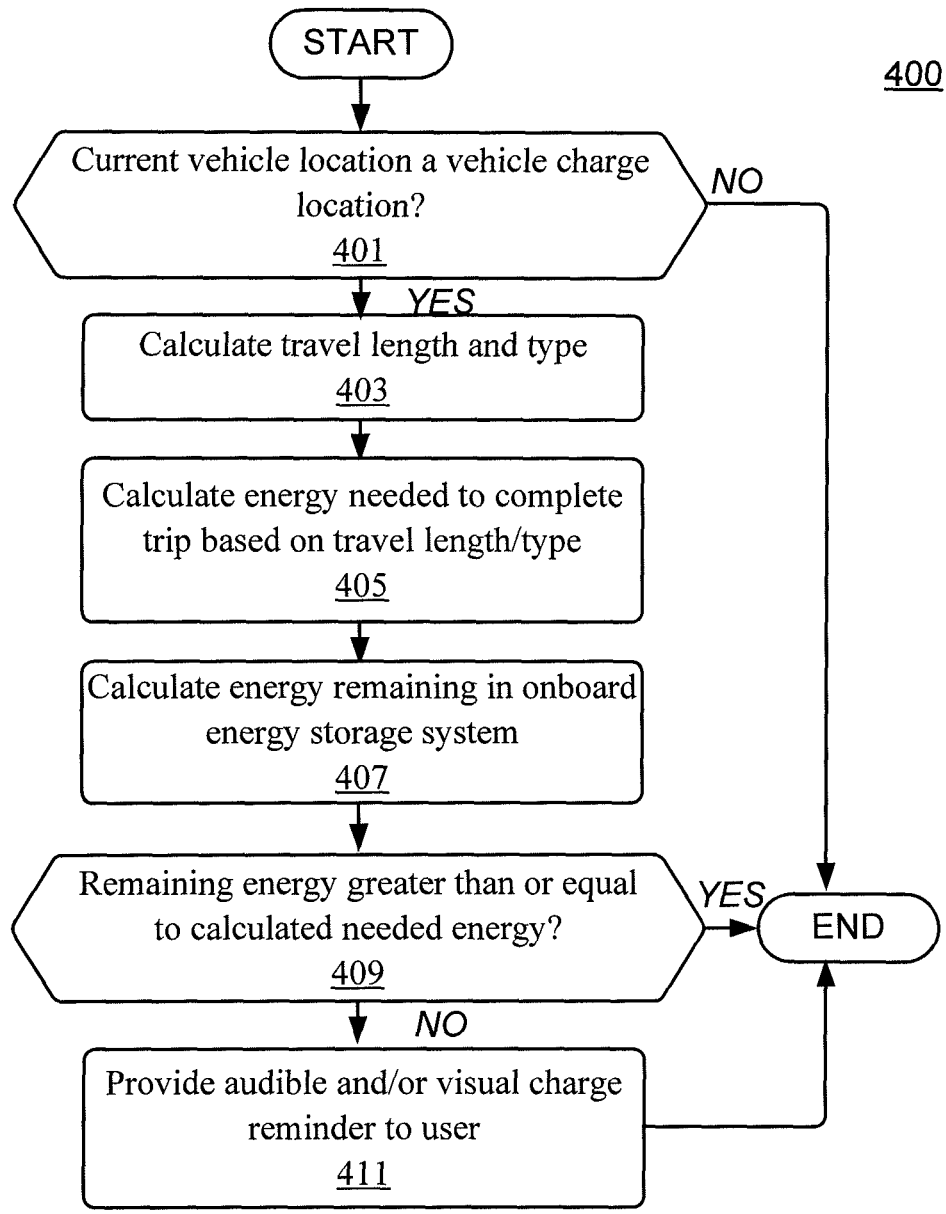
FIG. 4 is a flow chart illustrating a process for providing a charge reminder to a user by reference to a known imminent travel condition according to an aspect of the described principles.

In greater detail, the flowchart of FIG. 4 illustrates a process 400 for providing a charge reminder to a user by reference to a known imminent travel condition according to an aspect of the described principles. At stage 401 of the process 400, the process 400 determines whether the current vehicle location is a vehicle charge location, e.g., the user's home or office (if used for charging). If the current vehicle location is not a vehicle charge location, then the process 400 exits. On the other hand, if the current vehicle location is a vehicle charge location, a travel length and type are calculated at stage 403.

As noted above, the length and type may be based on roads of known condition (e.g., highway, local road, dirt road, frequent stoplights, etc.) and length due to observation of regular user driving behavior or based on calculations from downloaded navigational instructions. Based on the determined travel length and type, the total energy consumption needed to complete the trip is calculated at stage 405.

At stage 407, the remaining energy in the onboard energy storage system 202 is evaluated, and is compared to the energy needed to complete the trip in stage 409. If the remaining energy is found to be greater than or equal to the needed energy, the process exits. Otherwise, the process 400 moves to stage 411 wherein a charge reminder is conveyed to the user in the manner indicated above by reference to FIG. 3. If the user observes and heeds the reminder, the onboard energy storage system 202 should provide sufficient energy to traverse the expected route, providing more efficient travel than relying on the auxiliary power unit part way through the trip.

In a further aspect of the described principles, a reminder can be provided in a situation wherein a vehicle as described above is sitting unused for an extended amount of time and the battery charge is diminished due to the passage of time. In such a situation, the system can notify the user via phone call, text message, or email that charging is required. In an aspect of the described principles however, the reminder is sent only if the vehicle is at a charging location. In a further aspect, the permissible hours of such remote notification can be configured by the user. For example, in an implementation wherein the user is notified when the vehicle is at a charging station and is not plugged in by a designated time, the time used for this determination may be user-settable.

Figure 5:
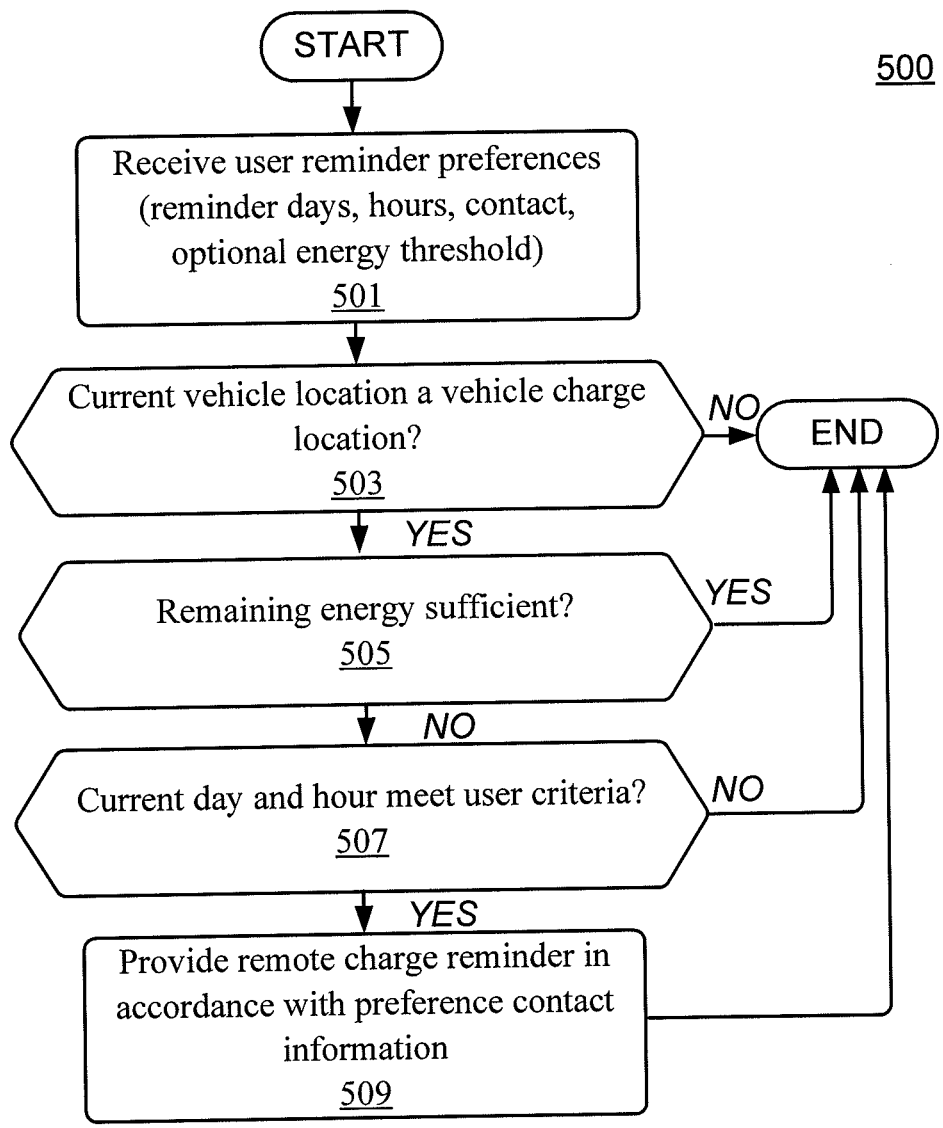
FIG. 5 is a flow chart illustrating a further process for providing a charge reminder to a user according to an aspect of the described principles.

FIG. 5 illustrates a flow chart of one implementation of this charge reminder system. The process 500 begins at stage 501, wherein the system receives, e.g., at the onboard telematics unit 114, a set of user preferences for reminders, including reminder hours and a reminder contact. The reminder hours specify the days and time ranges in which the user desires to receive reminders, e.g., daily 8:00 AM to 9:00 PM. The reminder contact specifies a manner in which a remote reminder may be sent from the vehicle to the user, e.g., a cell phone number, a landline number and/or a user email address. In one implementation, the reminder is sent directly to another application or device via short range facilities, e.g. Wi-Fi network or via push notification directly to a mobile application. The user may also specify a charge level at which to send a reminder, or a default charge threshold value may be provided, e.g., the energy required for a 10 mile trip.

At stage 503, the system checks the vehicle location to determine whether the vehicle is at a charge location. If the vehicle is at a charge location, the system checks the energy level in the onboard energy storage system 202 at stage 505. If the energy level in the onboard energy storage system 202 is determined to be less than the predetermined threshold, the system checks the user reminder criteria against the current day and hour, at stage 507, and sends a reminder via one or more of the user's chosen contact methods at stage 509 if the current day and hour meet the user's reminder criteria. This reminder may recur periodically or may be issued only once, depending upon user preference.

Thus it will be appreciated that the disclosed system and method provide a timely charge notification to vehicle users when needed and when charging facilities are available. Otherwise, the described system and method avoid needlessly notifying the user, since the user may avoid being stranded or inconvenienced by employing the vehicle's auxiliary power unit. It will also be appreciated, however, that the described systems, methods and implementations are merely examples of the inventive principles, and that these illustrate only preferred techniques. It is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of assisting a user of an electric vehicle having a chargeable onboard energy storage system in maintaining a charge state of the chargeable onboard energy storage system comprising:
    identifying one or more charging locations for the vehicle;
    determining a current location of the vehicle;
    determining the charge state of the onboard energy storage system to evaluate the remaining usable energy in the onboard energy storage system; and
    conveying a charge reminder to the user of the vehicle only upon determining a current status of the vehicle wherein the remaining usable energy in the onboard energy storage system is less than a reference value, the vehicle is powered down, and the current location of the vehicle matches an identified charging location for the vehicle.

2. The method according to claim 1, wherein identifying one or more charging locations for the vehicle includes requesting user input of charging location data.

3. The method according to claim 1, wherein identifying one or more charging locations for the vehicle includes automatically recording charging location data based on sensing one or more locations where charging has previously occurred with respect to the vehicle.

4. The method according to claim 1, wherein the onboard energy storage system comprises a battery and wherein determining the charge state of the onboard energy storage system includes reading one of a static voltage level and a dynamic voltage level.

5. The method according to claim 1, wherein determining the charge state of the onboard energy storage system includes maintaining a record of energy usage and comparing the energy usage against a known energy capacity of the onboard energy storage system.

6. The method according to claim 1, wherein the reference value is based on the energy needed to complete a known user trip.

7. The method according to claim 1, wherein determining that the vehicle is powered down comprises determining whether the vehicle is in a state indicating that the vehicle will remain stationary for a sufficient period of time to at least partly charge the onboard energy storage system.

8. The method according to claim 1, wherein determining a current location of the vehicle comprises using a GPS reading to resolve the location of the vehicle.

9. The method according to claim 1, wherein determining a current location of the vehicle comprises using a local Wi-Fi network identifier resolve the location of the vehicle.

10. The method according to claim 1, wherein conveying a charge reminder to the user of the vehicle comprises playing an audible reminder.

11. The method according to claim 1, wherein conveying a charge reminder to the user of the vehicle comprises displaying a visual reminder to the user.

12. The method according to claim 1, further comprising sensing that charging of the onboard energy storage system has begun, and in response to sensing that charging of the onboard energy storage system has begun, ceasing to convey the charge reminder.

13. A non-transitory computer-readable medium including computer-executable instructions that, when executed by a telematics unit of an electric vehicle having a chargeable onboard energy storage system, facilitate assisting a user of the electric vehicle in maintaining a charge state of the chargeable onboard energy storage system by performing a method comprising the steps of:
    identifying one or more charging locations for the vehicle;
    determining a current location of the vehicle;
    determining the charge state of the onboard energy storage system to evaluate the remaining usable energy in the onboard energy storage system; and
    conveying a charge reminder to the user of the vehicle only upon determining a current status of the vehicle wherein the remaining usable energy in the onboard energy storage system is less than a reference value, the vehicle is powered down, and the current location of the vehicle matches an identified charging location for the vehicle.

14. The non-transitory computer-readable medium of claim 13, wherein identifying one or more charging locations for the vehicle includes requesting user input of charging location data.

15. The non-transitory computer-readable medium of claim 13, wherein identifying one or more charging locations for the vehicle includes automatically recording charging location data based on sensing one or more locations where charging has previously occurred with respect to the vehicle.

16. The non-transitory computer-readable medium of claim 13, wherein the onboard energy storage system comprises a battery and wherein determining the charge state of the onboard energy storage system includes reading one of a static voltage level and a dynamic voltage level.

17. The non-transitory computer-readable medium of claim 13, wherein determining the charge state of the onboard energy storage system includes maintaining a record of energy usage and comparing the energy usage against a known energy capacity of the onboard energy storage system.

18. The non-transitory computer-readable medium of claim 13, wherein the reference value is based on the energy needed to complete a known user trip.

19. The non-transitory computer-readable medium of claim 13, wherein determining that the vehicle is powered down comprises determining whether the vehicle is in a state indicating that the vehicle will remain stationary for a sufficient period of time to at least partly charge the onboard energy storage system.

20. The non-transitory computer-readable medium of claim 13, wherein determining a current location of the vehicle comprises using a GPS reading to resolve the location of the vehicle.

\* \* \* \* \*